US008260261B2

(12) United States Patent
Teague

(10) Patent No.: US 8,260,261 B2
(45) Date of Patent: Sep. 4, 2012

(54) SECURING PAIRING VERIFICATION OF DEVICES WITH MINIMAL USER INTERFACES

(75) Inventor: Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 12/551,536

(22) Filed: Aug. 31, 2009

(65) Prior Publication Data

US 2011/0053558 A1 Mar. 3, 2011

(51) Int. Cl.
*H04M 1/66* (2006.01)
*H04M 1/68* (2006.01)
*H04M 3/16* (2006.01)

(52) U.S. Cl. .............................. 455/411; 455/410; 726/2

(58) Field of Classification Search ........................ None
See application file for complete search history.

(56) References Cited

U.S. PATENT DOCUMENTS

| | | | | |
|---|---|---|---|---|
| 7,606,370 | B2* | 10/2009 | Lillie et al. | 380/278 |
| 7,933,413 | B2* | 4/2011 | Steeves et al. | 380/278 |
| 2004/0111601 | A1* | 6/2004 | Racz | 713/150 |
| 2004/0172535 | A1* | 9/2004 | Jakobsson et al. | 713/168 |
| 2008/0195866 | A1* | 8/2008 | Roth et al. | 713/171 |
| 2009/0095812 | A1* | 4/2009 | Brown et al. | 235/380 |
| 2009/0158039 | A1* | 6/2009 | Prasad et al. | 713/168 |

OTHER PUBLICATIONS

International Search Report and Written Opinion—PCT/US2010/047299, International Searching Authority—European Patent Office, Nov. 4, 2010.
Kumar A., et al., "A comparative study of secure device pairing methods" Pervasive and Mobile Computing, Elsevier, vol. 5, No. 6, Dec. 1, 2009, pp. 734-749, XP026772140.
Menezes, Vanstone, Oorschot: "Handbook of Applied Cryptography" 1997, CRC Press LLC, USA, pp. 397-399, XP002605905.
Zisiadis D., et al., "ViDPSec Visual Device Pairing Security Protocol" Computational Science and Engineering, 2009. CSE '09. International Conference on, IEEE, Piscataway, NJ, USA, Aug. 29, 2009, pp. 359-364, XP031544005.

* cited by examiner

*Primary Examiner* — Ajit Patel
(74) *Attorney, Agent, or Firm* — James T. Hagler

(57) ABSTRACT

A method, system and devices for enabling secure pairing between two communication devices equipped with a minimal user interface includes determining a verification pattern based upon security information exchanged between the two communication devices and presenting the verification pattern in a manner that can be perceived by a user who can determine whether the verification patterns are the same. The verification patterns may be presented as flashing light displays, such as flashing sequences of a light emitting diode, or as sounds, such as tones or click patterns emitted by a speaker. If a user perceives that the verification patterns emitted by both communication devices are the same, the user may so indicate by pressing a button on each of the devices. Obtaining such user confirmation of the verification patterns enables establishing a secure pairing between the two communication devices that is protected from active and passive eavesdropping.

37 Claims, 5 Drawing Sheets

SECURING PAIRING VERIFICATION OF DEVICES WITH MINIMAL USER INTERFACES

FIELD OF THE INVENTION

The present invention relates generally to computer network communications, and more specifically to methods and devices for confirming a secure pairing between two or more communication devices equipped with a simple user interface.

BACKGROUND

In many communication applications there is a need for establishing a secure communication link between two communication devices. A common example of such a need exists between cellular telephones and wireless headsets which communicate with each other via the Bluetooth® protocol. Establishing a secure communication link between two communication devices protects against passive eavesdropping by unauthorized parties and against active eavesdropping (known as man-in-the-middle attacks).

A number of different methodologies are known for establishing secure communication links between two wireless communication devices. One method commonly used in conjunction with the Bluetooth® communication protocol, known as Simple Pairing, uses strong encryption algorithms to provide users with protection against passive and active eavesdropping. Using strong encryption algorithms complicates the task of a would-be eavesdropper, since such eavesdropping requires solving a difficult public key problem in order to derive the link key for a communication session.

User interaction with the communication devices may be necessary to protect against the man-in-the-middle attack. A man-in-the-middle attack occurs when a user wants to connect two devices, but instead of connecting directly with each other, the devices connect to a third (attacking) device that plays the role of the other device with which each device is attempting to pair. The attacking device then relays information between the two communication devices giving the illusion that they are directly connected. The attacking device may eavesdrop on communications between the two devices (known as active eavesdropping) as well as insert new or modify information and commands communicated over the link.

Current methods for secure pairing are outlined in the Simple Pairing Whitepaper published by the Bluetooth® Special Interest Group (Rev. V10r00, pub. 2006-08-03) which describes the Simple Pairing feature in the Lisbon release of the Bluetooth Core Specification, the entire contents of which are hereby incorporated by reference. Two current methods seek to defeat a man-in-the-middle attack require the user seeking to establish the secure pairing between two communication devices to take an action. Specifically, the current methods require the user to confirm that a six-digit number displayed on one device is the same as the six digit number displayed on the other device (known as "Numeric Comparison"), or type a six digit number displayed on one device into the second device (known as "Passkey Entry"). User confirmation or entry of the six digit number enables the user to verify that the two communication devices are talking directly to each other and not via a third device. The six digit number is an artifact of a security algorithm that provides no benefit in decrypting subsequent encoded data exchanges. (A third method uses another "out of band" communication link to exchange or transfer cryptographic numbers used in the pairing process, but this method requires the devices to include two different types of transceivers.)

While the Numeric Comparison simple pairing method provides strong protection against man-in-the-middle attacks, the method requires that both communication devices include displays which can show the six digit number. Similarly, the Passkey Entry requires one device to include a display that can show the six digit number and the other device to include a numeric keypad to receive the passkey entry. Thus, these methods may be unsuitable for simple or small communication devices that do not have room or the processing power to support such a display or keypad.

SUMMARY

The various embodiments provide devices and methods for users to confirm a secure pairing between two communication devices, one or both of which is equipped with a simple user interface, such as a single light, such as an emitting diode (LED), or a simple speaker. To verify that two communication devices are able to establish a secure pairing free from active eavesdropping (e.g., a man-in-the-middle attack), the light (e.g., a LED) can be caused to flash or the speaker can be activated to sound so as to present a verification pattern for perception by a user. The verification pattern may be based upon a security algorithm that is part of the secure pairing process. A user initiating the secure pairing of the two communication devices can easily recognize when two flashing lights are flashing in synchrony and following an identical pattern of flashes. Similarly, a user can also recognize when two pulsing or tonal sound patterns are synchronous and following an identical pattern. If the user determines that the flash or sound patterns on both communication devices are identical, the user can confirm the communication link, such as by pressing a single button on each device. When the user confirms the communication link, the secure pairing process can continue in the ordinary manner in order to establish a secure communication link between the two devices. Thus, the various embodiments enable secure pairing with protection against man-in-the-middle attacks for devices which are equipped with a user interface no more sophisticated than a single LED or a simple speaker (e.g., a piezoelectric sound emitter) and an input mechanism, such as a button, for receiving the user verification input.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
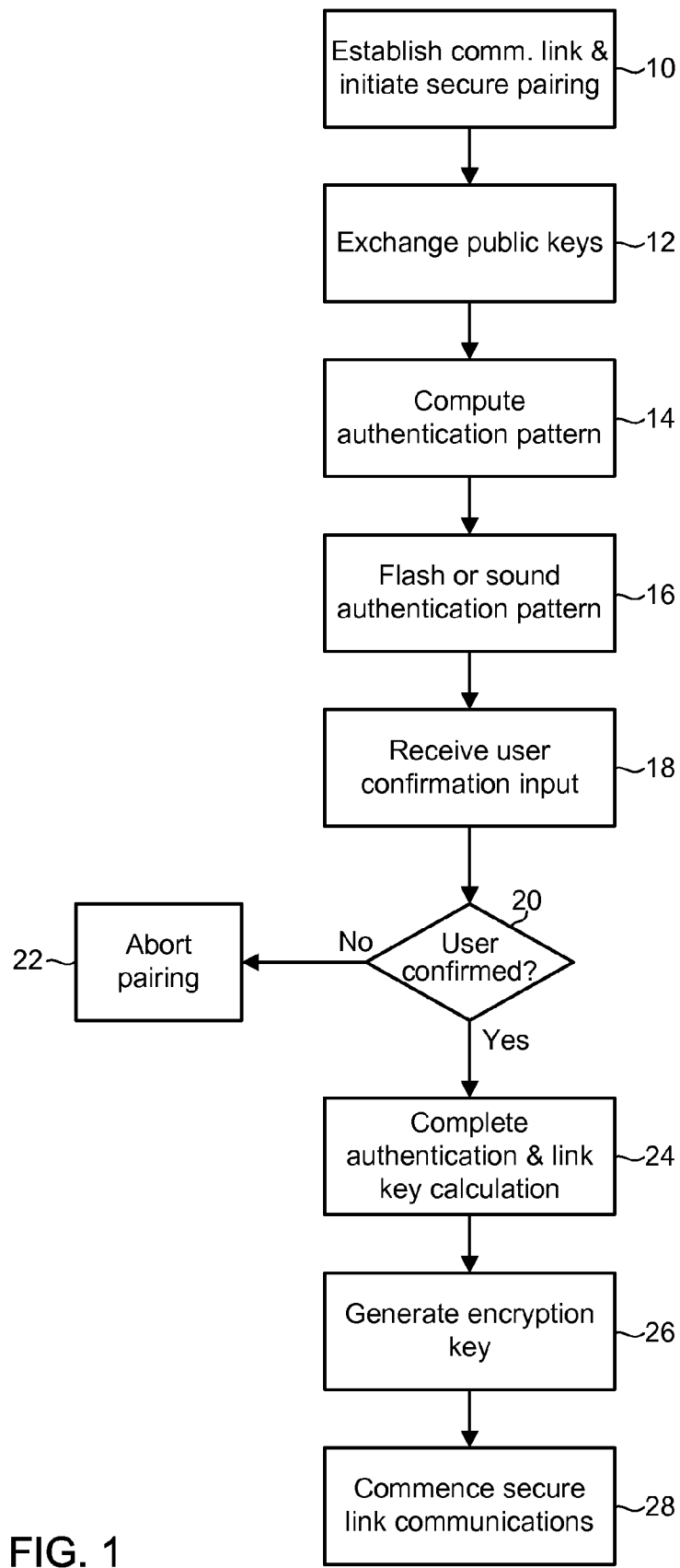
FIG. 1 is a process flow diagram of an embodiment method for accomplishing secure pairing of communication devices based upon user recognition of verification patterns produced by the communication devices.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "mobile device" refers to any one or all of cellular telephones, personal data assistants (PDA's), palm-top computers, wireless electronic mail receivers and cellular telephone receivers (e.g., the Blackberry® and Treo® devices), multimedia Internet enabled cellular telephones (e.g., the Blackberry Storm®), and similar personal electronic devices which include a programmable processor and memory, a wireless communication transceiver.

The term "simple signaling mechanism" is referred to herein as either a light emitter, such as a light emitting diode, or a sound emitter, such as a piezoelectric speaker, that can be activated by a communication device to present simple information for perception by a user.

The various embodiments concern wireless communication link security measures. The embodiments may be used with any of a variety of communication link technologies including, for example, IEEE 802.11 (WiFi), WiMax, Bluetooth®, IEEE 802.15.4, and Zigbee® wireless communication protocols and standards. References to particular communication technologies or protocols, such as the Bluetooth® protocol or Bluetooth-enabled devices, are for example purposes only and are not intended to limit the scope of the claims in any manner except as specifically recited in the claims.

Wireless communication links between electronic devices have proven to be extremely popular and useful, as evidenced by the explosive growth of Bluetooth-enabled devices and wireless networked peripherals. From automobiles to television sets, and cellular telephones to high-end refrigerators, practically every major electronic convenience is "going wireless." Each communication link established by such wireless-enabled devices presents an opportunity for eavesdropping by unauthorized devices. In some cases, such as a communication link between a refrigerator and a wireless network access point, the risk posed by eavesdropping is minimal as the information has little intrinsic value or the devices are immune to being hijacked. However, many communication links, such as the Bluetooth® connection between a cellular telephone and a wireless headset, carry personal information that should or must be protected from eavesdropping. With the growth of wireless applications, the need for secure communication links is expected to grow.

As mentioned above, a common method for securing a wireless communication link involves computation of a verification number in a security algorithm running on each communication device establishing a secure pairing, combined with displaying the verification number on each device so a user can verify that the numbers are the same. This numeric comparison method is designed to ensure that a man-in-the-middle attack has a small chance of succeeding. Thus, for communication devices with displays that can show six digits, the numeric comparison method provides very strong protection against active and passive eavesdropping with only a 1 in 1,000,000 chance of being defeated. However, the method cannot be used for devices that cannot display the six digit number, which may leave communication links between such devices vulnerable to active eavesdropping. It should be noted that the number of digits is selected to provide an adequate level of security while minimizing the impact on the user experience. Fewer numbers can be displayed for user comparison if a higher risk of eavesdropping can be accepted.

It is anticipated that the growth in wireless electronic devices will encompass relatively small devices that do not have sufficient size, processing capability or battery power to present six verification numbers to a user. A common example of such a device is the wireless telephone headset which typically uses a Bluetooth® protocol communication link. Such wireless devices, being sized to appear innocuous when being worn by a user, typically do not include a display. Thus, the secure pairing methodology employed for such wireless telephone headsets provides limited protection against man-in-the-middle attacks.

While such vulnerability may be acceptable in the case of wireless headsets, other applications of miniature wireless devices may not be so forgiving. For example, medical applications of wireless devices are likely to require fully secure communication links due to the sensitivity of medical information. With the continued miniaturization of electronic components it is anticipated that the medical industry will soon deploy miniaturized electronic medical sensors which can be placed on or within a patient to record and report any of variety of medically important parameters. In order to reduce the clutter and confusion in the hospital environment, such miniaturized electronic medical sensors may be made wireless, thereby obviating the need for wires connecting them to a data collection unit. To keep the size and power requirements of miniaturized electronic medical sensors to a minimum, such sensor devices are likely to be too small to host a six digit numeric display. Yet, personal privacy concerns and federal regulations are likely to require that the wireless data communication links between wireless medical sensors and monitoring equipment or hospital networks be protected by encryption provided by secure pairing.

The various embodiments enable establishing secure pairing between small communication devices that may include a simple signaling device, such as only a single LED (or a similar controllable light source) or a simple speaker. Instead of a display showing a six (or other number) digit verification number on a display, the simple signaling mechanism on each of the two communication devices can be activated according to a verification pattern determined according to a verification algorithm. Thus, if the two devices include an LED, the LED on each device can be flashed according to the verification pattern, and if the two devices include a speaker, the speaker on each device can be caused to emit sound according to the verification pattern. If the two communication devices have successfully exchanged public keys and nonce values for use in computing an encryption key for a communication session, a verification algorithm computed in both communication devices will select the same verification pattern to be signaled on the simple signaling mechanism in a LED flash pattern or sound pattern or tune. The user can then easily recognize when the two devices are displaying the same flash pattern or sounding the same sound or tune and press a button (or other input) on each device to indicate that the secure pairing process should proceed. Thus, in a very simple and user-friendly manner, very small and unsophisticated communication devices can be configured for secure communications with protections from active eavesdropping attacks.

For communication devices implementing the various embodiments, the only required user interface is a simple signaling mechanism, such as single LED or similar light display, and a button (or similar input device). Most electronic devices include at least one LED to indicate when the device is on or off. Thus, most communication devices already include a simple signaling mechanism sufficient to enable the various embodiments to be implemented without making changes to their hardware. For example, a communication device may be configured with software instructions to flash the power indicator LED on and off according to a verification pattern.

As an alternative to using an LED or other light signal as the simple signaling mechanism, communication devices may be equipped with a small sound generator or speaker, such as a simple piezoelectric vibrator coupled to the device processor. As is well known, piezoelectric speakers can be very small, inexpensive and power efficient, an example of which are the speakers used in audio greeting cards. As such, a piezoelectric speaker can easily be included within small form communication devices. By energizing the piezoelectric speaker in short pulses very quickly in succession, an electronic device can produce a pattern of sound including tones, hums, buzzes and clicks of varying frequencies. The human ear is adept at detecting tones and rhythms and recognizing when two sounds are not the same. For example, if two speakers emit similar sounds but at slightly different frequencies, a listener will detect beats and wavering sound effects as the two sounds alternatively go into and out of synchrony. Thus, a user attempting to establish a secure pairing link between two communication devices can recognize very quickly from their sound patterns whether the two devices are prepared to establish a secure link. In addition to simple sound patterns, communication devices may also draw from a large repertoire of songs, music and rhythms that can be correlated to different verification values. Instead of correlating a verification number to a particular vibration pattern, the device processor can use the number to select a particular tune or a sequence of notes that will be played on the device's piezoelectric speaker. Users can easily recognize when two tunes are not the same, or if the same, are not in the same key or in the same rhythm.

Using audible verification patterns for communicating verification signals to a user may be advantageous when the user is visually impaired. Audible verification patterns may also be useful when one or both of the communication devices are packaged where they cannot be viewed by a user, such as a component built into an appliance, such as an automobile, or an appliance that does not have a visible surface.

The various embodiments may implement known communication security mechanisms such as device-to-device pairing, encrypted data links, integrity checking, and establishing a trust domain. To extend a trust domain to another device, the receiving device needs to be verified as a valid new member, and the credentials need to be exchanged securely. Before communications begin, establishment of the trust domain and the credentials of each communication device need to be authenticated. The various embodiments address the verification and authentication process that occurs before secure communications begin between two communication devices.

The processes of establishing communication links between two communication devices are well known. As a first step, communication devices will discover one another such as by listening to radio frequency signals associated with a device discovery protocol for the particular communication technology being used. Once another communication device is discovered, a communication link may be negotiated using a link establishment protocol defined for the communication technology. With a communication link established, the two devices may exchange public keys and other security information in order to begin the process of establishing a secure link. Using exchanged security information and information known to each communication device, each device may execute a verification algorithm. The verification algorithm may include generating a verification value that can be use to confirm that the devices are free of an active eavesdropping attack and able to initiate a secure communication link. To establish a secure and authenticated pairing between the two communication devices, a user must verify that the process has been completed successfully, which heretofore has been accomplished by a user implementing a numeric comparison or passkey entry if an out-of-band communication link is not also available. Once the communication devices have been authenticated to each other and their process verified by a user, each device can authenticate itself to the other by exchanging computed values that only those devices can calculate based upon the exchanged credential information. If this authentication step is completed successfully, the two devices each calculate a link key derived from a shared key and the exchanged public keys and nonce values, and then use that link key to generate encryption keys which are used to encrypt subsequent secure communications between the two devices.

The various embodiments replace the numeric comparison operation with activation of a simple signaling mechanism according to a verification pattern to provide a light flash or sound pattern comparison process. FIG. 1 illustrates an embodiment method for secure pairing of two communication devices equipped only with a simple signaling mechanism of either an LED display or a sound generator. As mentioned above, to initiate a secure pairing, two communication devices will establish a communication link between each other and begin the process of initiating secure pairing, step 10. As part of this process, the two communication devices will exchange public keys (PKa, PKb), step 12. In a typical secure pairing process, each device will generate its own public-private key pair which will be generated only once per device and may be computed in advance of the pairing. At any time, a communication device may discard its public-private key pair and generate a new one, although this need not occur every time a secure link is to be established. To initiate a secure link, the initiating communication device may transmit its public key to the responding communication device, retaining its private key as a secret value. The responding communication device may then reply with its own public key. The initiating and/or responding communication devices may also exchange a random value or nonce that can also be used as part of the secure pairing process. For ease of reference, public keys and nonce values exchange as part of establishing a secure pairing between two communication devices are referred to generally herein as "security information." Having exchanged public keys and nonce values, step 12, the communication devices may use the exchanged security information and their own private keys to compute a verification pattern that may be presented to the user by activating the simple signaling mechanism to flash or sound the verification pattern as part of the authentication or verification process, step 14. Example methods for computing the verification pattern are described below with reference to FIGS. 2-4.

When both communication devices have determined the appropriate verification pattern, they may begin to flash or sound that verification pattern, step 16, so that a user can compare the patterns and determine if they are the same. If the user determines that the two verification patterns are identical, the user may so indicate by a providing an input to each communication device, such as by pressing a button on each device. Each communication device receives this user confirmation input, step 18, and to determine whether the user has confirmed the secure pairing, determination 20. If the user fails to confirm that the verification patterns are the same (i.e., determination 20="No"), the communication devices abort the secure pairing process, step 22. If the user input indicates that the verification patterns are confirmed (i.e., determination 20="Yes"), the communication devices complete the authentication process and calculates the link key, step 24. Using the link key, the communication devices can generate appropriate encryption keys, step 26, and commence secure link communications using those keys, step 28.

Figure 2:
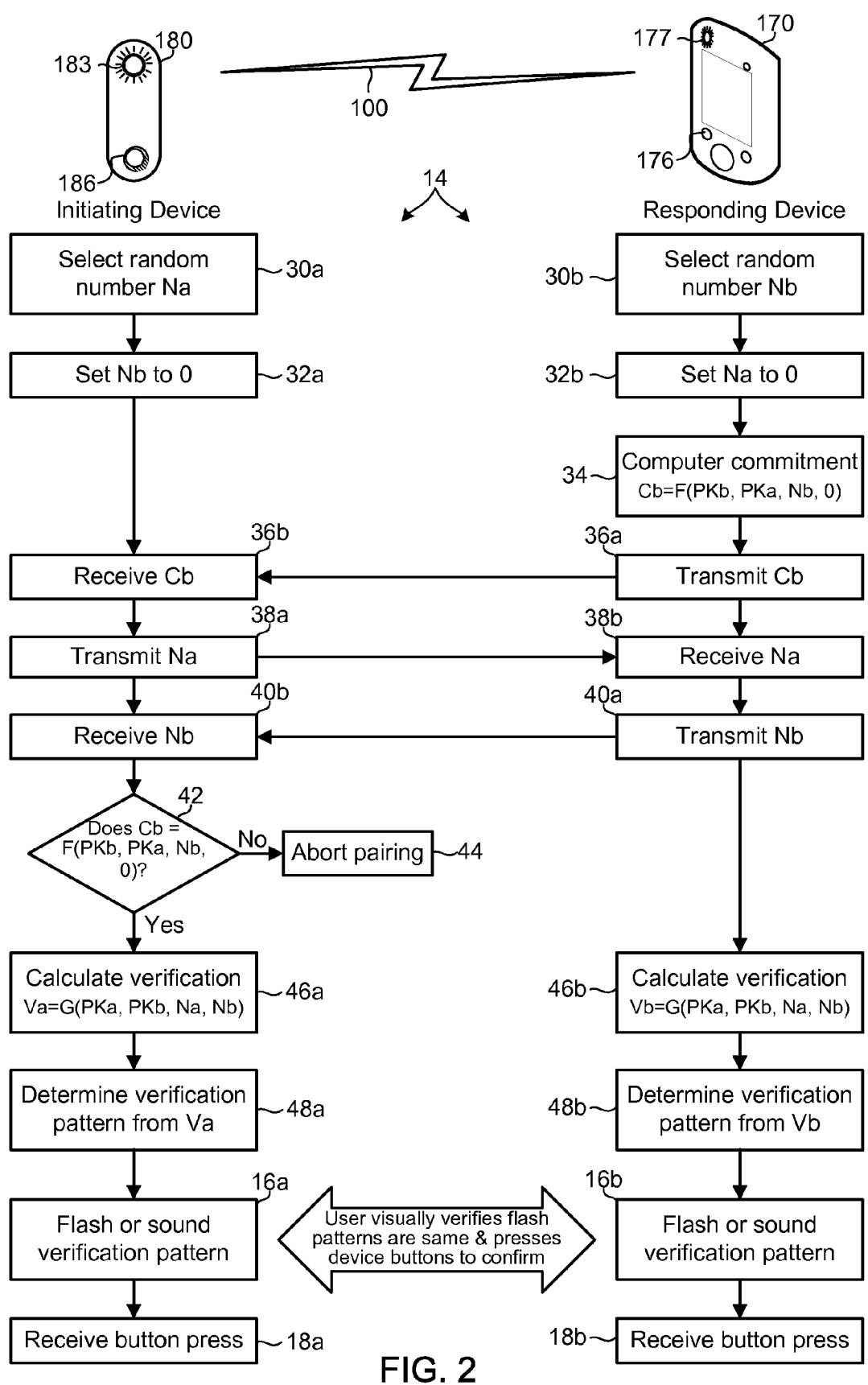
FIG. 2 is a process flow diagram of an embodiment method for computing a verification pattern that can be flashed or sounded to enable a user to verify a secure pairing process between two communication devices.
Figure 3:
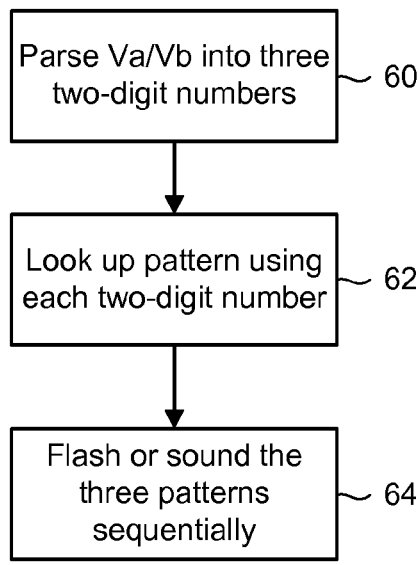
FIG. 3 is a process flow diagram of an example embodiment method for determining a verification pattern based upon a calculated verification value.

FIG. 2 illustrates an example embodiment for computing an appropriate verification pattern, step 14, and displaying or sounding that pattern in order to receive a user confirmation, steps 16 and 18. Secure pairing may be accomplished between two communication devices, such as a cellular telephone 170 and a wireless mono-headset 180, such as a Bluetooth® headset. Such communication devices will communicate via a wireless link 100 which can be used for both establishing the secure link and for conducting secure communications once the secure link is established. In this example illustration, the wireless mono-headset 180 is treated as the initiating device and the cellular telephone 170 is treated as the responding device. The process of establishing a secure pairing may be initiated by the cellular telephone 170, so this example method is for illustration purposes only. Further, this process may be initiated by any form of communication device, and thus is not limited to the example of a cellular telephone and wireless headset.

The embodiment method illustrated in FIG. 2 is based upon the Simple Pairing feature in the Lisbon release of the Bluetooth Core Specification. This embodiment method is well known and widely implemented in a variety of communication devices. However, other methods of establishing secure communication links between two communication devices may be used with the various embodiments.

Referring to FIG. 2, after public keys have been exchanged (step 12 in FIG. 1), each communication device 170, 180 may select or generate a nonce Na, Nb, step 30a, 30b. A nonce is a random number that is generated, used only once, and then discarded to protect against replay attacks. In a particular embodiment, each nonce Na and Nb is a pseudo-random 128-bit nonce value. Methods for generating suitable nonce values are well known in the electronic communication arts. The communication devices 170, 180 may also set to zero a variable reserved for the nonce (Na or Nb) to be received from the other device, steps 32a, 32b. The responding communication device 170 may then compute a commitment value Cb, step 34. The commitment value Cb is a value computed by an algorithm function F using as input the exchanged public keys and information known to that device, such as its own public key (PKb), the public key of the initiating device 180 (PKa), its own nonce Nb, and the zero value assigned to the other device's nonce Na. In an example embodiment, the algorithm function F may use a key-hashed Message Authentication Code (HMAC) function based on SHA-256 with a 128-bit key Nb. The responding device 170 may then transmit its commitment value Cb to the initiating device, step 36a, which receives the value, step 36b. In response, the initiating device 180 transmits its nonce Na to the responding device 170, step 38a, which receives the value, step 38b. In response to receiving the initiating device nonce Na, the responding device 170 transmits its own nonce Nb, step 40a, which is received by the initiating device 180, step 40b. At this point, the initiating communication device 180 may compute its own commitment value Cb using the information it has received from the responding device 170 to determine if the calculated value matches the received value, determination 42. In other words, the initiating device 180 calculates the commitment value using the same algorithm function F and the same input values (i.e., the exchanged public keys and responding device nonce Nb). If the calculated commitment value does not match the received commitment value (i.e., determination 42="No"), the initiating device 180 may abort the secure pairing process since this result indicates that the devices will be unable to complete the secure pairing process, step 44.

If the initiating device 180 determines that the calculated commitment value matches the received value (i.e., determination 42="Yes"), the device may continue the secure pairing process by calculating a verification value Va, step 46a. The verification value Va may be calculated using a security algorithm G that uses as inputs the exchanged public keys PKa, PKb, and nonce values Na, Nb. In an example embodiment, the security algorithm G may be the SHA-256 hash function defined by the National Security Agency and published by NIST as a U.S. Federal Information Processing Standard. This certification value may be truncated or used as calculated in order to determine a verification pattern corresponding to the calculated verification value Va, step 48a. A variety of different methods may be used for determining a corresponding verification pattern, step 48a, two examples of which are described below with reference to FIGS. 3 and 4.

Simultaneously, the responding device 170 also calculates the verification value Va using the same algorithm and the same input values, step 46b, and uses the calculated value to determine the corresponding verification pattern, step 48b.

The two communication devices then begin to flash or sound the determined verification pattern, steps 16a and 16b. As mentioned above, the user observes or listens to the flash or sound patterns emitted by the simple signaling mechanism and determines whether the emitted patterns are the same on both communication devices, and if so presses a button (or provides a similar input) on each communication device 170, 180 to confirm that the verification patterns match. The two communication devices 170, 180 receive their respective button presses, steps 18a, 18b, and proceed to complete the secure pairing as described above with reference to FIG. 1.

In order to ensure the patterns of light or sound are synchronized between the two communication devices, some coordinating signal may be transmitted from one communication device to the other to initiate the verification display or sounds. Since the communication devices will have negotiated a communication link some synchronization of timing between the devices will already have been established. Thus, all that is required is for one device to signal the other when the display or sound should begin. Thus, as part of or just before step 16a, the initiating device 180 may transmit a start signal to the responding device 170. This start signal may include a timing synchronization information so that both devices 170, 180 begin displaying or sounding the verification pattern simultaneously.

It is worth noting how the foregoing method for exchanging nonce values, commitment values and confirming verification patterns protect against an active man-in-the-middle attack. In order to be successful, a man-in-the-middle attacker must inject its own key information into the process between the two communication devices to have any effect other than to deny a secure communication link. An attacker's attempt to create verification patterns which will match both the initiating device 180 and responding device 170 is defeated by the sequence in which the attacker and communication devices must exchange the nonce values. If the attacker first exchanges nonce values Na, Nb with the responding device 170 by posing as an initiator device, it must commit to the nonce Nb that it will use with the initiating device before it receives the real nonce Na from the initiating device 180. If the attacker first exchanges nonces with the initiating device 180, it must send a nonce Na to the responding device before seeing the nonce Nb from the responding device. In either case, the attacker must commit (via the commitment value) to at least the second of its nonces before knowing the second nonce from the legitimate devices. The attacker therefore cannot choose its own nonce values in such a way as to cause the verification values to be the same between it and the initiating device 180 and between it and the responding device 170. Therefore, the verification patterns determined by the initiating and responding legitimate communication devices will not be the same. Thus, a user attempting to establish a secure pairing between the two communication devices will be alerted to the attack by the different verification patterns being flashed or sounded.

With a verification value calculated (such as by using the example method described above), any of a variety of different methods may be used to determine a verification pattern based upon that value. One example illustrated in FIG. 3 uses the calculated verification value as an input for a table lookup process to obtain an appropriate verification pattern from a table of verification patterns. For example, the verification value, may be truncated to 32 bits (e.g., by a mod $2^{32}$ function) which is converted into a six digit decimal value that is parsed into three two-digit numbers, step 60. Each of the resulting two-digit numbers are used as the table lookup values to select an appropriate one of 100 different verification patterns in the table, step 62. The three selected verification patterns may then be flashed or sounded sequentially to create the final verification pattern, step 64. If the table includes 100 different verification patterns, the concatenation of the three patterns selected based on the three two-digit numbers will yield a million different possible flash or sound patterns. Conversion of the verification value into three two-digit decimal numbers is only one example of how the verification value can be used select a verification pattern from a look up table; fewer or more digits may be used and binary values may be used in a similar manner with like effect.

A table of verification patterns may be a simple data structure in which data records are indexed with a lookup value and contain pattern data. Such pattern data may be in a binary format suitable for translation into a flash pattern that can be implemented with an LED or a vibration pattern or digital sound file that can be implemented with a piezoelectric speaker, for example.

Figure 4:
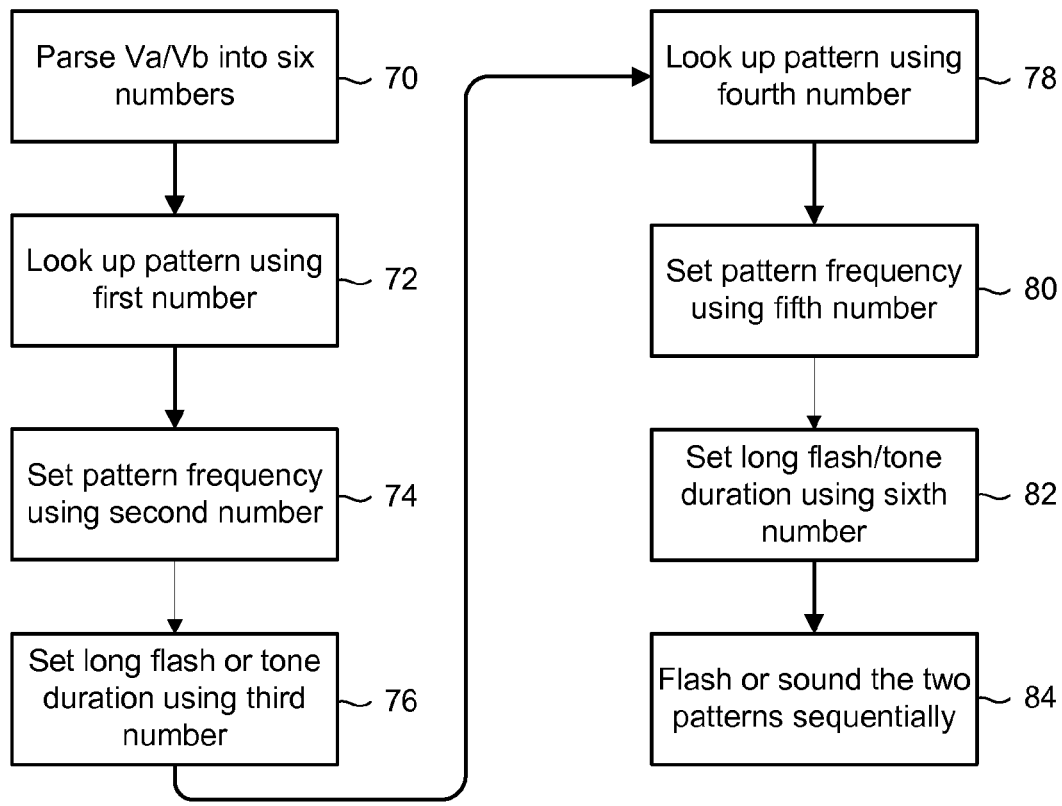
FIG. 4 a process flow diagram of another example embodiment method for determining a verification pattern based upon a calculated verification value.

A second example method for determining a verification pattern based upon a verification value is illustrated in FIG. 4. In this second example, the verification value is converted into a six digit decimal number value which is parsed into six one-digit values, step 70. The first digit is then used to look up or calculate a verification pattern, step 72. For example, a lookup table containing ten basic verification patterns may be used to determine the pattern with an index value equal to the first digit. As another example, an algorithm may use the first digit to generate a basic verification pattern. The second digit may be used to set or modify the frequency of the verification pattern, such as the frequency of LED flashing or the sound frequency, step 74. By adjusting the pattern frequency according to one of ten different factors, the selected basic verification pattern can yield 100 recognizably different patterns. The third digit may be used to adjust the nature or duration of some elements within the pattern, step 76, such as the duration of long flashes or tones. This additional modification factor increases the number of recognizably different patterns by another factor of 10. This process may be repeated for the fourth through sixth digit, by selecting another basic pattern based upon the fourth digit, step 78, adjusting the frequency based upon the fifth number, step 80, and adjusting long-duration flashes or tones based on the sixth number, step 82. The resulting two patterns then may be concatenated into a single longer pattern that is flashed or sounded for comparison by the user, step 84.

In a third example method, the verification value may be converted to base 8 and the resulting digits used to select within an eight note scale musical notes that can be applied to a piezoelectric speaker. Since the verification value may be a very long number, the resulting conversion to musical notes will result in a tune (though probably not a melody) which, when played on two different devices, a user can easily recognize as being the same or different.

The foregoing three example methods illustrate that a wide variety of different types of methods may be used to determine or generate a verification pattern based upon calculated verification values, including table lookup processes, pattern generating algorithms, and pattern modifying algorithms. A suitable method yields patterns that users can recognize as being distinct or the same with sufficient variations to minimize the chances that an attacker can successfully guess the correct pattern.

Figure 5:
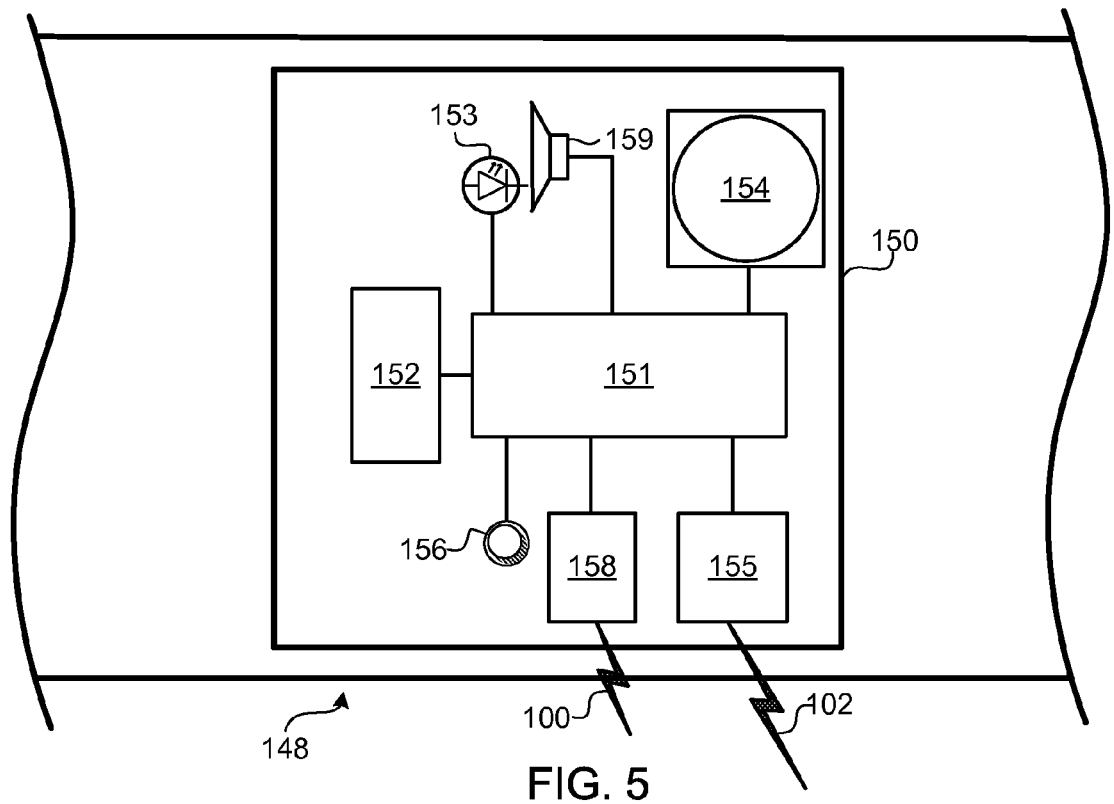
FIG. 5 is a component block diagram of a first wireless communication device suitable for use with various embodiments.
Figure 6:
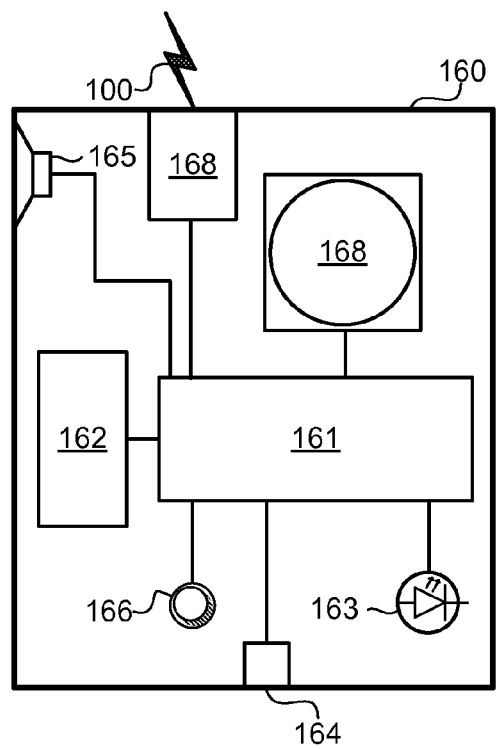
FIG. 6 is a component block diagram of an example wireless sensor suitable for use with the first wireless communication device illustrated in FIG. 5.
Figure 7:
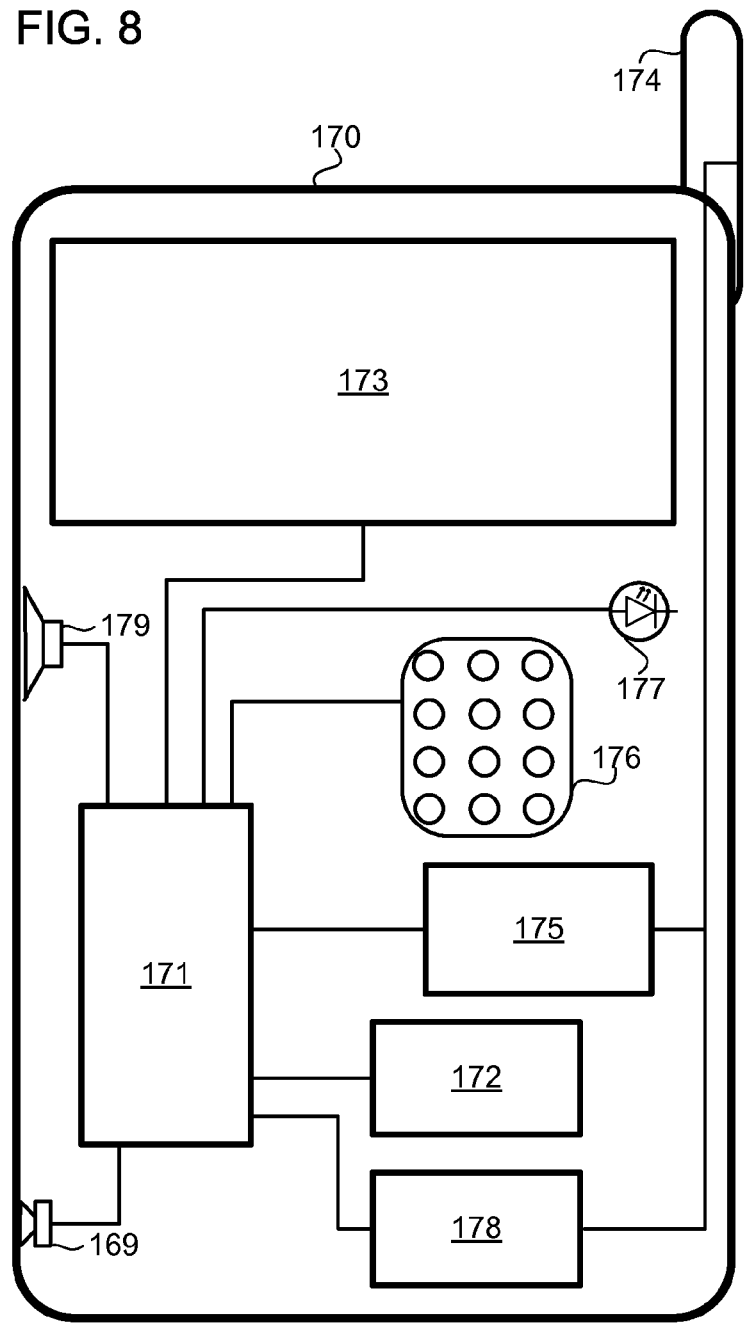
FIG. 7 is a component block diagram of a mobile device suitable for use with the various embodiments.

The embodiments may be used with a wide variety of communication devices, some examples of which are illustrated in FIGS. 5-7.

A first example communication device illustrated in FIG. 5 is a wireless data relay device 150 such as may be incorporated within a medical wristband 148 and configured to relay medical sensor data received from wireless sensors via a personal area network to a hospital wide-area wireless network. Such a wireless data relay device 150 may include a processor 151, and a memory 152, battery 154, personal area network transceiver 158, wide-area transceiver 155, and button 156 (or similar user input device) all coupled to the processor 151. Additionally, a LED 153 and/or a piezoelectric speaker 159 may be coupled to the processor 151 for flashing or sounding the verification pattern.

An example miniaturized wireless medical sensor 160 that might be used with a wireless data relay device 150 is illustrated in FIG. 6. A miniaturized wireless medical sensor 160 may include a processor 161 coupled to memory 162 and a power supply, such as a battery 168. The miniaturized wireless medical sensor 160 may include a personal area network transceiver 165 coupled to the processor 161 and an antenna configured to establish personal area network-range wireless communications, such as using the BlueTooth® protocol. The miniaturized wireless medical sensor 160 may further include a medical sensor 164 which may be any of a variety of the medical mechanical, electrical or chemical sensors that are well known in the medical arts. Further, the miniaturized wireless medical sensor 160 may include a button 166 (or similar user input device) coupled to the processor 161, and a light LED 163 and/or a piezoelectric speaker 165 coupled to the processor 151 for flashing or sounding the verification pattern.

In use, a secure communication link may be established between the miniaturized wireless medical sensor 160 and the wireless data relay device 150 in order to communicate patient medical data. To establish the secure communication link, the two device processors 151, 161 may be configured with software instructions according to the various embodiments to initiate a secure pairing process and, at the appropriate stage, activate the LED 153, 163 or piezoelectric speaker 159, 165 according to a determined verification pattern. A user setting up the communication link may verify that the flashed or sounded verification patterns are the same, and if so, press the buttons 156, 166 on the two devices 150, 160, thereby causing them to complete the secured pairing process and begin encrypted data communications via personal area network transmissions 100. In a similar manner, the wireless data relay device 150 may be linked to a hospital wide-area network via the wide-area transceiver 155 so that the patient data may be relayed to the hospital information systems via wide-area network transmissions 102. A similar process may be used to establish a second secure pairing between the wireless data relay device 150 and a wireless access node of the hospital's wide-area network. For example, the wireless access node (not shown) may be equipped with an LED or speaker as well as a user input device to enable a user setting up a secure communication link to verify that a secure communication link can be established using the embodiments described herein. Further details regarding possible operations of a wireless data relay device 150 to relay patient data from a wireless sensor to a hospital network are disclosed in commonly owned U.S. patent application Ser. No. 12/482,175 entitled "Identification and Connectivity Gateway Wristband for Hospital and Medical Applications", filed Jun. 10, 2009, the entire contents of which are hereby incorporated by reference.

As mentioned above, the various embodiments may be used to connect peripheral wireless devices with a cellular telephone, an example of which is illustrated in FIG. 7. A typical cellular telephone 170 will include a processor 171 coupled to internal memory 172 and a display 173. Additionally, the cellular telephone 170 may have an antenna 174 for sending and receiving electromagnetic radiation that is connected to a wireless data link and/or cellular telephone transceiver 175 coupled to the processor 171. Cellular telephones 170 typically also include a key pad 176 or miniature keyboard, menu selection buttons or rocker switches 177 for receiving user inputs, a speaker 179 for generating sound, and a microphone 169 for receiving sound, all coupled to the processor 161. Additionally, cellular telephones 170 typically include at least one LED 177 coupled to the processor 171. Further, a cellular telephone 170 may include a second wireless transceiver, such as a Bluetooth® transceiver 178 coupled to the processor 171 and to the antenna 174 for establishing a wireless communication link with another communication device, such as a wireless headset 180.

Figure 8:
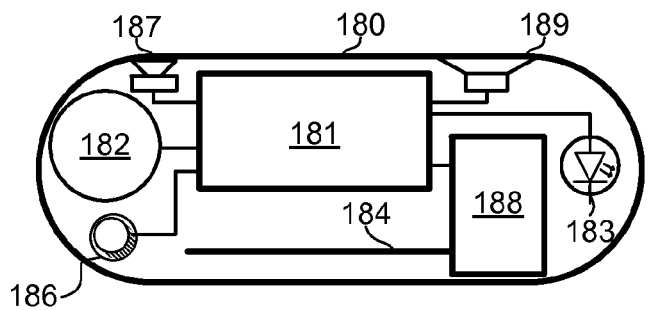
FIG. 8 is a component block diagram of a wireless headset device suitable for use with the various embodiments in conjunction with the mobile device embodiment illustrated in FIG. 7

FIG. 8 illustrates example components that may be included within a wireless communication device, such as a Bluetooth® wireless mono-headset 180, suitable for establishing a secure communication link with a cellular telephone 170 according to the various embodiments. For example, a Bluetooth® wireless mono-headset 180 may include a processor 181, and a battery 182, microphone 187, speaker 189 and button 186, all coupled to the processor 181. A wireless data transceiver, such as a Bluetooth® transceiver 188 may be coupled to the processor 181 and to an internal antenna 184. Additionally, the wireless mono-headset 180 may include an LED 183 coupled to the processor 181.

As described above, the processors 171, 181 within the cellular telephone 170 and mono-headset 180 may be configured with software instructions to initiate a secure pairing process and, at the appropriate stage, activate the LED 177, 183 or speakers 179, 185 according to a determined verification pattern. A user setting up a Bluetooth® link between the cellular telephone 170 and the wireless mono-headset 180 may verify that the flashed or sounded verification patterns are the same, and if so, press the buttons 176, 186 on the two devices 170, 180, thereby causing them to complete the secured pairing process and begin encrypted data communications.

In the various devices, the processors 151, 161, 171 and 181 may be any programmable microprocessor, microcomputer or multiple processor chip or chips that can be configured by software instructions to perform a variety of operations, including the operations of the various embodiments described above. In some devices, multiple processors 151, 161, 171 and 181 may be provided, such as one processor dedicated to wireless communication functions and one processor dedicated to running other applications. Typically, software instructions may be stored in the internal memory 152, 162, 172 before they are accessed and loaded into the processor 151, 161, 171. In some devices, the processor 151, 161, 171 and 181 may include internal memory sufficient to store the software instructions. For the purposes of this description, the term memory refers to all memory accessible by the processor 151, 161, 171 and 181, including connected memory units 152, 162, 172 and memory within the processor 151, 161, 171 and 181 itself. Verification pattern data may be stored in the memory unit 152, 162, 172 or within the processor 151, 161, 171 and 181. In many devices, the memory 152, 162, 172 may be a volatile or nonvolatile memory, such as flash memory, or a mixture of both.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Similarly, the order in which elements are recited in claims are arbitrary and do not imply that such elements must be performed in the order presented. For example, determining whether an intervening configuration change has occurred since a last communication with a device management server may be accomplished by a computing device before or after initiating a device management session or establishing a communication link to a server. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for verifying a secure pairing between two communication devices, comprising:
   calculating on each of the two communication devices a verification value based upon security information exchanged between the two communication devices;
   performing on each of the two communication devices a table look up process using at least a portion of the verification value to select a verification pattern from a table of verification patterns;
   presenting on each of the two communication devices the verification pattern for perception by a user as one of a flashing light pattern and a sound pattern; and
   receiving a user input indicating that the verification patterns on each of the two communication devices are the same.

2. The method of claim 1, wherein the verification pattern is presented as a flashing light pattern displayed by a light emitting diode.

3. The method of claim 1, wherein the verification pattern is presented as a sound pattern emitted by a speaker.

4. The method of claim 1, further comprising:
   exchanging public keys between the two communication devices;
   selecting a first nonce in a first one of the two communication devices;
   selecting a second nonce in a second one of the two communication devices;
   calculating a commitment value in the first one of the two communication devices based upon the exchanged public keys and the first nonce;
   transmitting the commitment value from the first one of the two communication devices to the second one of the two communication devices;
   transmitting the second nonce from the second one of the two communication devices to the first one of the two communication devices in response to receiving the commitment value; and
   transmitting the first nonce from the first one of the two communication devices to the second one of the two communication devices in response to receiving the second nonce;
   wherein calculating on each of the two communication devices the verification value based upon security information exchanged between the two communication devices comprises:
      calculating on each of the two communication devices the verification value based upon the exchanged public keys, the first nonce and the second nonce.

5. A communication system, comprising:
   a first communication device; and
   a second communication device,
   wherein each of the first and second communication devices comprise:
      a processor;
      a transceiver coupled to the processor;
      a button coupled to the processor; and
      a simple signaling mechanism coupled to the processor,
      wherein the processor of each of the first and second communication devices is configured with processor-executable instructions to perform operations comprising:

calculating a verification value based upon security information exchanged between the first and second communication devices;
performing a table look up process using at least a portion of the verification value to select a verification pattern from a table of verification patterns;
presenting on the simple signaling mechanism of each of the first and second communication devices the verification pattern for perception by a user; and
completing a secure pairing between the first and second communication devices if a button press is received on both first and second communication devices.

6. The communication system of claim 5, wherein:
the simple signaling mechanism of each of the first and second communication devices is a light emitting diode; and
the verification pattern is presented as a flashing light pattern displayed by the light emitting diodes.

7. The communication system of claim 5, wherein:
the simple signaling mechanism of each of the first and second communication devices is a speaker; and
the verification pattern is presented as a sound pattern emitted by the speakers.

8. The communication system of claim 5, wherein the processor of each of the first and second communication devices is configured with processor-executable instructions to perform operations further comprising:
exchanging public keys between the first and second communication devices;
selecting a first nonce in the first communication device;
selecting a second nonce in the second communication device;
calculating a commitment value in the first communication device;
transmitting the commitment value from the first communication device to the second communication device;
transmitting the second nonce from the second communication device to the first communication device in response to receiving the commitment value; and
transmitting the first nonce from the first communication device to the second communication device in response to receiving the second nonce;
wherein calculating the verification value based upon security information exchanged between the two communication devices comprises:
calculating on each of the first and second communication devices a verification value based upon the exchanged public keys, the first nonce and the second nonce.

9. A first communication device, comprising:
a processor;
a transceiver coupled to the processor;
a button coupled to the processor; and
a simple signaling mechanism coupled to the processor,
wherein the processor is configured with processor-executable instructions to perform operations comprising:
exchanging security information with a second communication device;
calculating a verification value based upon the exchanged security information;
performing a table look up process using at least a portion of the verification value to select a verification pattern from a table of verification patterns;
activating the simple signaling mechanisms according to the selected verification pattern; and
completing a secure pairing with the second communication device if the button is pressed after the simple signaling mechanism is activated.

10. The communication device of claim 9, wherein:
the simple signaling mechanism is a light emitting diode; and
the verification pattern is presented as a flashing light pattern displayed by the light emitting diode.

11. The communication device of claim 9, wherein:
the simple signaling mechanism is a speaker; and
the verification pattern is presented as a sound pattern emitted by the speaker.

12. The communication device of claim 9, wherein the processor is configured with processor-executable instructions to perform operations further comprising:
transmitting a first public key to the second communication device;
receiving a second public key from the second communication device;
selecting a first nonce;
calculating a commitment value based upon the first public key, the second public key and the first nonce;
transmitting the commitment value to the second communication device;
receiving a second nonce from the second communication device; and
transmitting the first nonce to the second communication device in response to receiving the second nonce, and
wherein calculating the verification value based upon the exchanged security information comprises:
calculating the verification value based upon the first and second public key, the first nonce and the second nonce.

13. A first communication device, comprising:
means for exchanging security information with a second communication device;
means for calculating a verification value based upon the exchanged security information;
means for performing a table look up process using at least a portion of the verification value to select a verification pattern from a table of verification patterns;
means for signaling the verification pattern; and
means for completing a secure pairing between with the second communication device if a button is pressed after the means for signaling the verification pattern is activated.

14. The communication device of claim 13, wherein:
means for signaling the verification pattern comprises means for flashing a light according to the verification pattern.

15. The communication device of claim 13, wherein:
means for signaling the verification pattern comprises means for emitting sound according to the verification pattern.

16. The communication device of claim 13, further comprising:
means for transmitting a first public key to the second communication device;
means for receiving a second public key from the second communication device;
means for selecting a first nonce;
means for calculating a commitment value based upon the first public key, the second public key and the first nonce;
means for transmitting the commitment value to the second communication device;
means for receiving a second nonce from the second communication device; and means for transmitting the first nonce to the second communication device in response to receiving the second nonce, and wherein the means for calculating the verification value based upon the exchanged security information comprises:

means for calculating the verification value based upon the first and second public key, the first nonce and the second nonce.

17. A non-transitory processor-readable medium having stored thereon processor-executable instructions configured to cause a processor of a first communication device to perform operations comprising:

exchanging security information with a second communication device;

calculating a verification value based upon the exchanged security information;

performing a table look up process using at least a portion of the verification value to select a verification pattern from a table of verification patterns;

activating a simple signaling mechanism according to the verification pattern; and completing a secure pairing with the second communication device if a button on the first communication device is pressed after the simple signaling mechanism is activated.

18. The non-transitory processor-readable medium of claim 17, wherein activating the simple signaling mechanism according to the verification pattern comprises flashing a light pattern on a light emitting diode.

19. The non-transitory processor-readable medium of claim 17, wherein activating the simple signaling mechanism according to the verification pattern comprises sounding a pattern from a speaker.

20. The non-transitory processor-readable medium of claim 17, wherein the stored processor-executable instructions are configured to cause a processor of a first communication device to perform operations further comprising:

transmitting a first public key to the second communication device;

receiving a second public key from the second communication device;

selecting a first nonce;

calculating a commitment value based upon the first public key, the second public key and the first nonce;

transmitting the commitment value to the second communication device;

receiving a second nonce from the second communication device; and transmitting the first nonce to the second communication device in response to receiving the second nonce; and wherein calculating the verification value based upon the exchanged security information comprises:

calculating the verification value based upon the first and second public key, the first nonce and the second nonce.

21. A method for verifying a secure pairing between two communication devices, comprising:

calculating on each of the two devices a verification value based upon security information exchanged between the two communication devices;

using on each of the two devices at least a portion of the verification value as an input to an algorithm to generate a verification pattern;

presenting on each of the two communication devices the verification pattern for perception by a user as one of a flashing light pattern and a sound pattern; and receiving a user input indicating that the verification patterns on each of the two communication devices are the same.

22. The method of claim 21, wherein the verification pattern is presented as one of a flashing light pattern displayed by a light emitting diode or as a sound pattern emitted by a speaker.

23. The method of claim 21, further comprising:

exchanging public keys between the two communication devices;

selecting a first nonce in a first one of the two communication devices;

selecting a second nonce in a second one of the two communication devices;

calculating a commitment value in the first one of the two communication devices based upon the exchanged public keys and the first nonce;

transmitting the commitment value from the first one of the two communication devices to the second one of the two communication devices;

transmitting the second nonce from the second one of the two communication devices to the first one of the two communication devices in response to receiving the commitment value; and transmitting the first nonce from the first one of the two communication devices to the second one of the two communication devices in response to receiving the second nonce;

wherein calculating on each of the two communication devices the verification value based upon security information exchanged between the two communication devices comprises:

calculating on each of the two communication devices the verification value based upon the exchanged public keys, the first nonce and the second nonce.

24. A communication system, comprising:

a first communication device; and a second communication device, wherein each of the first and second communication devices comprise:

a processor;

a transceiver coupled to the processor;

a button coupled to the processor; and a simple signaling mechanism coupled to the processor, wherein the processor of each of the first and second communication devices is configured with processor-executable instructions to perform operations comprising:

calculating a verification value based upon security information exchanged between the first and second communication devices;

using at least a portion of the verification value as an input to an algorithm to generate a verification pattern;

presenting on the simple signaling mechanism of each of the first and second communication devices the verification pattern for perception by a user; and completing a secure pairing between the first and second communication devices if a button press is received on both first and second communication devices.

25. The communication system of claim 24, wherein:

the simple signaling mechanism of each of the first and second communication devices is a light emitting diode; and the verification pattern is presented as a flashing light pattern displayed by the light emitting diodes.

26. The communication system of claim 24, wherein:
the simple signaling mechanism of each of the first and second communication devices is a speaker; and
the verification pattern is presented as a sound pattern emitted by the speakers.

27. The communication system of claim 24, wherein the processor of each of the first and second communication devices is configured with processor-executable instructions to perform operations further comprising:
exchanging public keys between the first and second communication devices;
selecting a first nonce in the first communication device;
selecting a second nonce in the second communication device;
calculating a commitment value in the first communication device;
transmitting the commitment value from the first communication device to the second communication device;
transmitting the second nonce from the second communication device to the first communication device in response to receiving the commitment value; and
transmitting the first nonce from the first communication device to the second communication device in response to receiving the second nonce;
wherein calculating on each of the first and second communication devices the verification value based upon security information exchanged between the first and second communication devices comprises:
calculating on each of the first and second communication devices the verification value based upon the exchanged public keys, the first nonce and the second nonce.

28. A first communication device, comprising:
a processor;
a transceiver coupled to the processor;
a button coupled to the processor; and
a simple signaling mechanism coupled to the processor,
wherein the processor is configured with processor-executable instructions to perform operations comprising:
exchanging security information with a second communication device;
calculating a verification value based upon the exchanged security information;
using at least a portion of the verification value as an input to an algorithm to generate a verification pattern;
activating the simple signaling mechanisms according to the verification pattern; and
completing a secure pairing between with the second communication device if the button is pressed after the simple signaling mechanism is activated.

29. The communication device of claim 28, wherein:
the simple signaling mechanism is a light emitting diode; and
the verification pattern is presented as a flashing light pattern displayed by the light emitting diode.

30. The communication device of claim 28, wherein:
the simple signaling mechanism is a speaker; and
the verification pattern is presented as a sound pattern emitted by the speaker.

31. The communication device of claim 28, wherein the processor is configured with processor-executable instructions to perform operations further comprising:
transmitting a first public key to the second communication device;
receiving a second public key from the second communication device;
selecting a first nonce;
calculating a commitment value based upon the first public key, the second public key and the first nonce;
transmitting the commitment value to the second communication device;
receiving a second nonce from the second communication device; and
transmitting the first nonce to the second communication device in response to receiving the second nonce, and
wherein calculating the verification value based upon the exchanged security information comprises:
calculating the verification value based upon the first and second public key, the first nonce and the second nonce.

32. A first communication device, comprising:
means for exchanging security information with a second communication device;
means for calculating a verification value based upon the exchanged security information;
means for performing a table look up process using at least a portion of the verification value to select a verification pattern from a table of verification patterns;
means for signaling the verification pattern; and
means for completing a secure pairing between with the second communication device if a button is pressed after the means for signaling the verification pattern is activated.

33. The communication device of claim 32, wherein:
means for signaling the verification pattern comprises one of means for flashing a light according to the verification pattern or means for emitting sound according to the verification pattern.

34. The communication device of claim 32, further comprising:
means for transmitting a first public key to the second communication device;
means for receiving a second public key from the second communication device;
means for selecting a first nonce;
means for calculating a commitment value based upon the first public key, the second public key and the first nonce;
means for transmitting the commitment value to the second communication device;
means for receiving a second nonce from the second communication device; and
means for transmitting the first nonce to the second communication device in response to receiving the second nonce, and
wherein the means for calculating the verification value based upon the exchanged security information comprises:
means for calculating the verification value based upon the first and second public key, the first nonce and the second nonce.

35. A non-transitory processor-readable medium having stored thereon processor-executable instructions configured to cause a processor of a first communication device to perform operations comprising:
exchanging security information with a second communication device;
calculating a verification value based upon the exchanged security information;
using at least a portion of the verification value as an input to an algorithm to generate a verification pattern;
activating a simple signaling mechanism according to the verification pattern; and completing a secure pairing with the second communication device if a button on the first communication device is pressed after the simple signaling mechanism is activated.

36. The non-transitory processor-readable medium of claim 35, wherein activating the simple signaling mechanism according to the verification pattern comprises one of flashing a light pattern on a light emitting diode, or sounding a pattern from a speaker.

37. The non-transitory processor-readable medium of claim 35, wherein the stored processor-executable instructions are configured to cause a processor of a first communication device to perform operations further comprising:
   transmitting a first public key to the second communication device;
   receiving a second public key from the second communication device;
   selecting a first nonce;
   calculating a commitment value based upon the first public key, the second public key and the first nonce;
   transmitting the commitment value to the second communication device;
   receiving a second nonce from the second communication device; and
   transmitting the first nonce to the second communication device in response to receiving the second nonce; and
   wherein calculating the verification value based upon the exchanged security information comprises:
      calculating the verification value based upon the first and second public key, the first nonce and the second nonce.

* * * * *